United States Patent
Peters et al.

[11] Patent Number: 6,064,854
[45] Date of Patent: May 16, 2000

[54] COMPUTER ASSISTED INTERACTIVE ENTERTAINMENT/EDUCATIONAL CHARACTER GOODS

[75] Inventors: Geoffrey W. Peters, Hillsboro; Philip R. Lantz, Cornelius; Gunner D. Danneels, Beaverton, all of Oreg.

[73] Assignee: Intel Corporation, Santa Clara, Calif.

[21] Appl. No.: 09/059,600

[22] Filed: Apr. 13, 1998

[51] Int. Cl.[7] .............................. A63F 9/22; G09B 5/06; A63H 3/28

[52] U.S. Cl. ........................ 434/308; 434/178; 463/1; 446/297; 446/175; 446/404

[58] Field of Search ................ 463/1, 9, 30, 31, 463/35, 36, 39, 40; 446/175, 297, 298, 397, 404, 408, 301, 300; 434/307 R, 308, 178

[56] References Cited

U.S. PATENT DOCUMENTS

| | | | |
|---|---|---|---|
| 4,846,693 | 7/1989 | Baer | 434/308 |
| 5,191,615 | 3/1993 | Aldava et al. | 434/308 |
| 5,636,994 | 6/1997 | Tong | 434/308 |
| 5,752,880 | 5/1998 | Gabai et al. | 434/308 |

*Primary Examiner*—Jessica J. Harrison
*Attorney, Agent, or Firm*—Blakely, Sokoloff, Taylor & Zafman LLP

[57] ABSTRACT

A character good suitable for entertainment and/or educational purposes is disclosed. The character good includes one or more audio and/or video input generation devices that operate to generate audio and/or video inputs responsive to audio sensed and/or scenes observed in the character good's surrounding, to provide the character good with simulated listening and/or visual ability. The generated audio and/or video input signals are forwarded to an external computer for processing. The character good further includes one or more audio and/or electromechanical devices that operate to manifest audio and/or gesture responses under the control of the external computer, to provide the character good with simulated speech and/or gesture ability. The external computer exercises the control responsive to the generated audio and/or video inputs. In one embodiment, the character good also includes a body having an exterior cover that operates to provide a facade for the character good and houses the audio and/or video input generation devices as well as the audio and/or electromechanical output devices.

26 Claims, 8 Drawing Sheets

State Definitions

Idle State

If greeting_recognized GOTO Greeting    } 322

Greeting State

Play greeting audio; Render greeting gesture sequence;

If read_a_book_recognized GOTO Show_Book;

...

if no_command_recognized GOTO Don't_Understand    } 324

Show_Book State

Play show_me_the_book audio;

Render show_me_the_book gesture sequence;

Turn on video

If book 1_recognized GOTO Book 1_Cover

...

If bookn_recognized GOTO Bookn_Cover if no_book_recognized GOTO Can't_See    } 326

Book1_Cover State

Play read_bookname audio;

Render read_bookname gesture sequence;

If page 1_recognized GOTO Book 1_Page 1

...

If pagen_recognized GOTO Book1_Pagen if no_page_recognized GOTO Can't_See    } 328

State Definitions (Cont'd)

Book 1_Pagei State

Play book 1_pagei audio;

Render book 1_pagei gesture sequence;

If page 1_recognized GOTO Book 1_Page 1

...

If pagen_recognized GOTO Book 1_Pagen if no_page_recognized GOTO Can't_See

} 330

...

Don't_Understand State

Play don't_understand audio;

Render don't_understand gesture sequence;

GOTO Idle

} 332

Can't_See State

Play can't_see audio;

Render can't_see gesture sequence;

Return

Sample Speech Files

Audio for "Hello, what would you like to do today?"
Audio for "Okay, show me the book you like to read!"
Audio for "Good, let's read <bookname>."
Audio for "Please turn a page."
Audio for "What would you like to do next?"
Audio for "Sorry, I don't understand."
Audio for "Sorry, I can't see."

} 342

...

Audio for Book 1, Cover, e.g. "Good, Let's read Book 1_Title."
Audio for the content of Book 1, Page 1.
...
Audio for the content of Book 1, Page n.

} 344

...

Audio for Bookn, Cover.
Audio for the content of Bookn, Page 1,
Audio for the content of Bookn, Page n.

Fig. 3d

Sample Gesture Files

Greeting Gesture Sequence t0, raise hands to position 1;

t1, clap hands pattern 1 for n second;

...

tn, lower hands to rest position.

} 352

Show_me_the_book Gesture Sequence t0, raise hands to position 2;

t1, open palms pattern 1 for n second;

...

tn, lower hands to rest position.

COMPUTER ASSISTED INTERACTIVE ENTERTAINMENT/EDUCATIONAL CHARACTER GOODS

BACKGROUND OF THE INVENTION

1. Field of the Invention

The present invention relates to the fields of computer based entertainment and computer aided education. In particular, the present invention relates to computer enhanced entertainment/educational character goods.

2. Background Information

Entertainment/educational (E/E) character goods such as Care Bear, Barney the Purple Dinosaur, and so forth, are well known in the art. Such character goods are useful in individual as well as group play or learning sessions. However conventional character goods all suffer from the disadvantage of having only limited ability to interact with the players/students. As microprocessor and other related technologies continue to advance, improving the price/performance of various electronic components, functionally more enriching E/E character goods that can provide players/students with more enriching interaction experience are desired. As will be disclosed in more details below, the present invention provides such interactive E/E character goods.

SUMMARY OF THE INVENTION

A character good is disclosed. The character good includes one or more audio and/or video input generation devices that operate to generate audio and/or video inputs responsive to audio sensed and/or scenes observed in the character good's surrounding, to provide the character good with simulated listening and/or visual ability. The generated audio and/or video input signals are forwarded to an external computer for processing. The character good further includes one or more audio and/or electromechanical devices that operate to manifest audio and/or gesture responses under the control of the external computer, to provide the character good with simulated speech and/or gesture ability. The external computer exercises the control responsive to the generated audio and/or video inputs.

BRIEF DESCRIPTION OF DRAWINGS

The present invention will be described by way of exemplary embodiments, but not limitations, illustrated in the accompanying drawings in which like references denote similar elements, and in which:

FIGS. 3a–3e are block diagrams illustrating one embodiment of an interactive E/E character application.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of their presentations.

Figure 1:
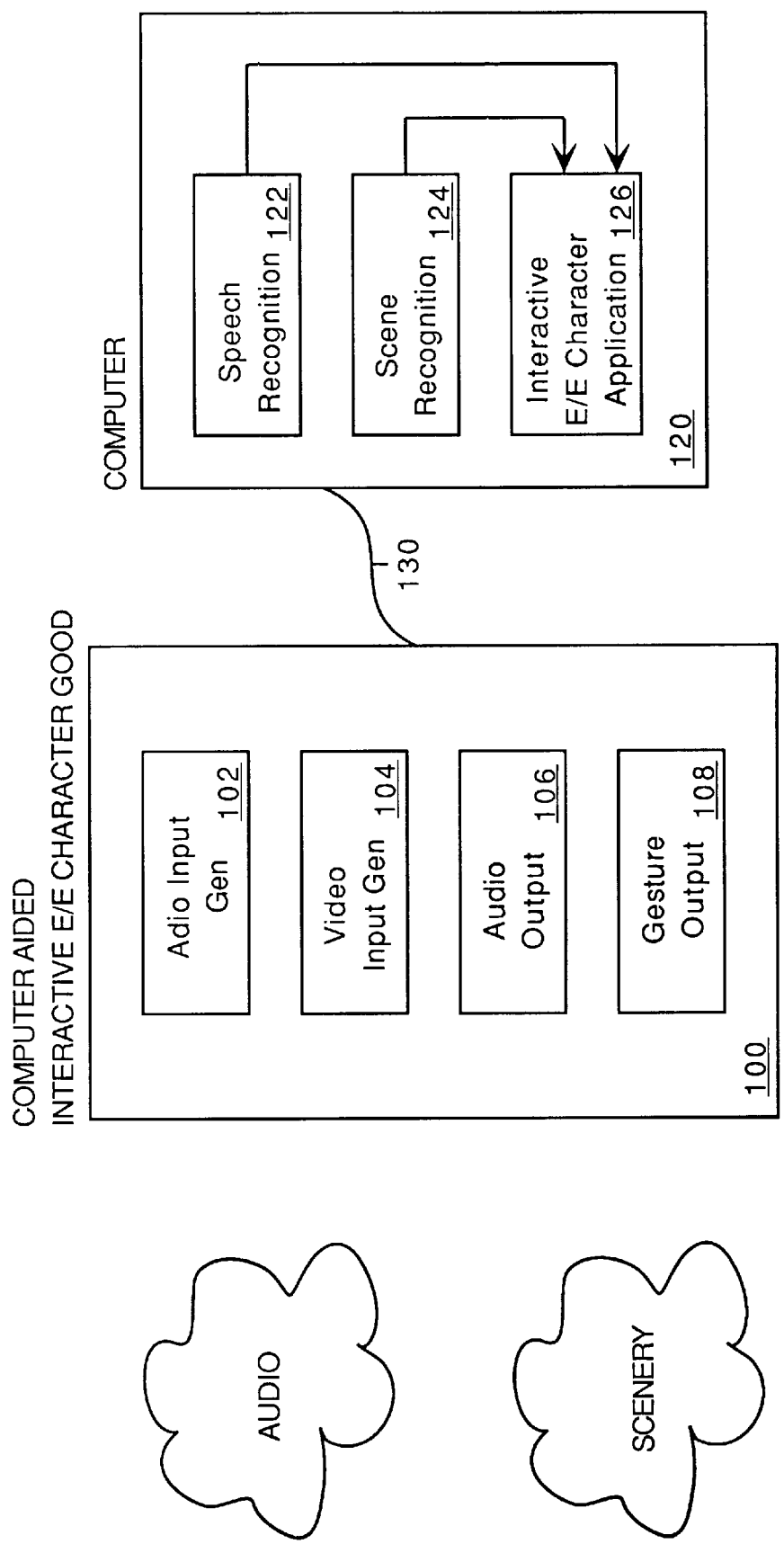
FIG. 1 illustrates an overview of the present invention including a character good and a computer incorporated with the teachings of the present invention.

Referring now to FIG. 1, wherein a block diagram illustrating an overview of the present invention is shown. As illustrated, the present invention includes interactive E/E character good 100 assisted by computer 120 to provide improved interactive experience to a player/user of character good 100. Both character good 100 and computer 120 are incorporated with the teachings of the present invention. From the description to follow, those skilled in the art will appreciate that under the present invention, a player/user may experience the improved interaction without having to interact with computer 120 or even realize that character good 100 is assisted by computer 120.

For the illustrated embodiment, interactive E/E character good 100 includes embedded audio and video input generation devices 102 and 104, as well as embedded audio and gesture output devices 106 and 108. Embedded devices 102–108 are housed in a body (not shown) having an exterior cover that operates to provide a fagade for the character. Computer 120 includes speech recognition service 122, scene recognition service 124 and interactive E/E character application 126.

Audio and video input generation devices 102 and 104 operate to generate audio and video input signals respectively, responsive to audio sensed and scenery observed in the character good's surroundings, to provide character good 100 with simulated listening and visual ability. Audio and gesture output devices 106 and 108 operate to manifest audio and gesture responses respectively, to provide character good 100 with simulated speech and gesture ability.

Audio and gesture output devices 106 and 108 manifest audio and gesture responses under the control of computer 120, which exercises the control responsive to the audio and video inputs generated by audio and video input generation devices 102 and 104, which are forwarded to computer 120 via communication medium 130. In one embodiment, communication medium 130 is a wireless medium. In another embodiment, the generated audio and video inputs are pre-processed (i.e. compressed) before forwarding to computer 120, to reduce bandwidth requirement on medium 130.

Speech recognition service 122 operates to process the received audio inputs (pre-processed or otherwise) to identify audio commands. If the received audio inputs are compressed, speech recognition service 122 further decompresses the received audio inputs prior to performing the audio command identification services. Scene recognition service 124 operates to process the received video inputs (pre-processed or otherwise) to identify scenes observed. If the received video inputs are compressed, scene recognition service 124 further decompresses the received video inputs prior to performing the scene identification services. The identification results are provided to interactive E/E character application 126, which then generates control signals for audio and gesture output devices 106 and 108 in accordance with at least the identification results. In one embodiment, the generated video inputs are forwarded to computer 120 continuously, and scene recognition service 124 performs the scene identification process periodically to facilitate detection of changes in the scenes observed.

Except for the novel constitution and the manner embedded elements cooperate 102–108 with computer 120, character good 100 is intended to represent a broad range of character goods known in the art, such as the aforementioned Care Bear and Barney the purple Dinosaur, as well as famous characters of the major studios (i.e. Disney, Paramount, Warner Brothers etc.), e.g. Mickey and Minnie Mouse and Winnie the Pooh, famous characters of various popular children shows, e.g. Sesame Street, Thomas the Tank Engine and Theodore the Tug Boat, famous characters of major toy manufacturers, e.g. Barbie and G.I. Joe, and so forth.

Speech recognition service 122 and scene recognition service 124 may be implemented using any one of a number of speech and object recognition techniques known in the art. In one embodiment, scene recognition service 124 is implemented using a color region based fuzzy object recognition technique, which is the subject co-pending U.S. patent application Ser. No. 09/059,641, entitled "Color Region Based Fuzzy Object Recognition and Applications", filed contemporaneously, having partial common inventorship and common assignee with the present invention. The application is hereby fully incorporated by reference.

The operational flow of interactive E/E character application 126 is application dependent. In one embodiment, it is a "reading" application having pre-stored audio files for various books, which in response to either audio commands and/or book pages identified by the speech/scene recognition services, causes appropriate portions of the pre-stored audio files to be rendered by audio output 106, simulating "reading" of the identified pages by character good 100, and optionally causing gesture output 108 to manifest gestures to supplement the simulated "reading".

Figure 2:
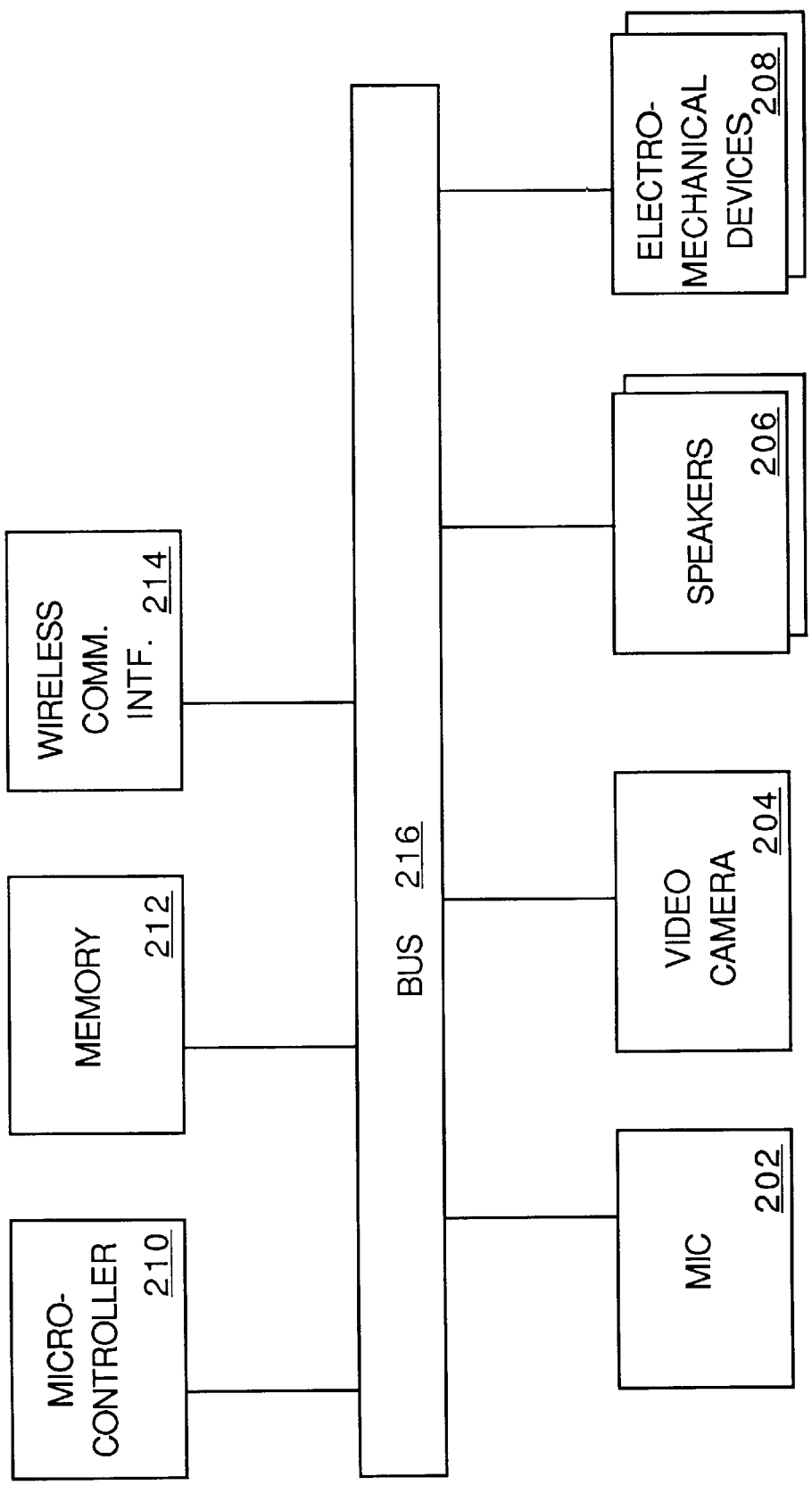
FIG. 2 is a block diagram illustrating an internal hardware architectural view of one embodiment of a character good suitable for use to practice the present invention.

FIG. 2 illustrates an internal hardware architectural view of one embodiment of character good 100. As shown, for the illustrated embodiment, character good 100 includes microphone 202 and video camera 204 that operate to generate the above described audio and video inputs responsive to audio sensed and scenes observed in the character good's surroundings. Character good 100 further includes speakers 206 and electromechanical devices 208 that operate to manifest the above described audio and gesture responses under the control of computer 120. Character good 100 also includes micro-controller 210, memory 212 having appropriate compression, communication and other control software stored therein, wireless communication interface 214 and bus 216. The elements are coupled to each other as shown. Micro-controller 210 and memory 212 operate to receive the generated audio and video inputs through bus 216, compress the inputs, and then forward the compressed inputs to computer 120 through wireless communication interface 214. Micro-controller 210 and memory 212 also operate to receive the control signals from computer 120 through wireless communication interface 214, and forward the control signals to speakers 206 and electromechanical devices 208 through bus 216.

In an alternate lower cost embodiment, a serial communication interface is employed instead. The serial communication interface is directly coupled to computer 120. For this embodiment, a less capable micro-controller as well as smaller amount of memory are employed. In yet another alternate lower cost embodiment, microphone 202, video camera 204, speakers 206 and electromechanical devices are directly connected to computer 120 through a bundled "pig tail" collection of the various wires (that is, without elements 210–216).

Figure 3A:
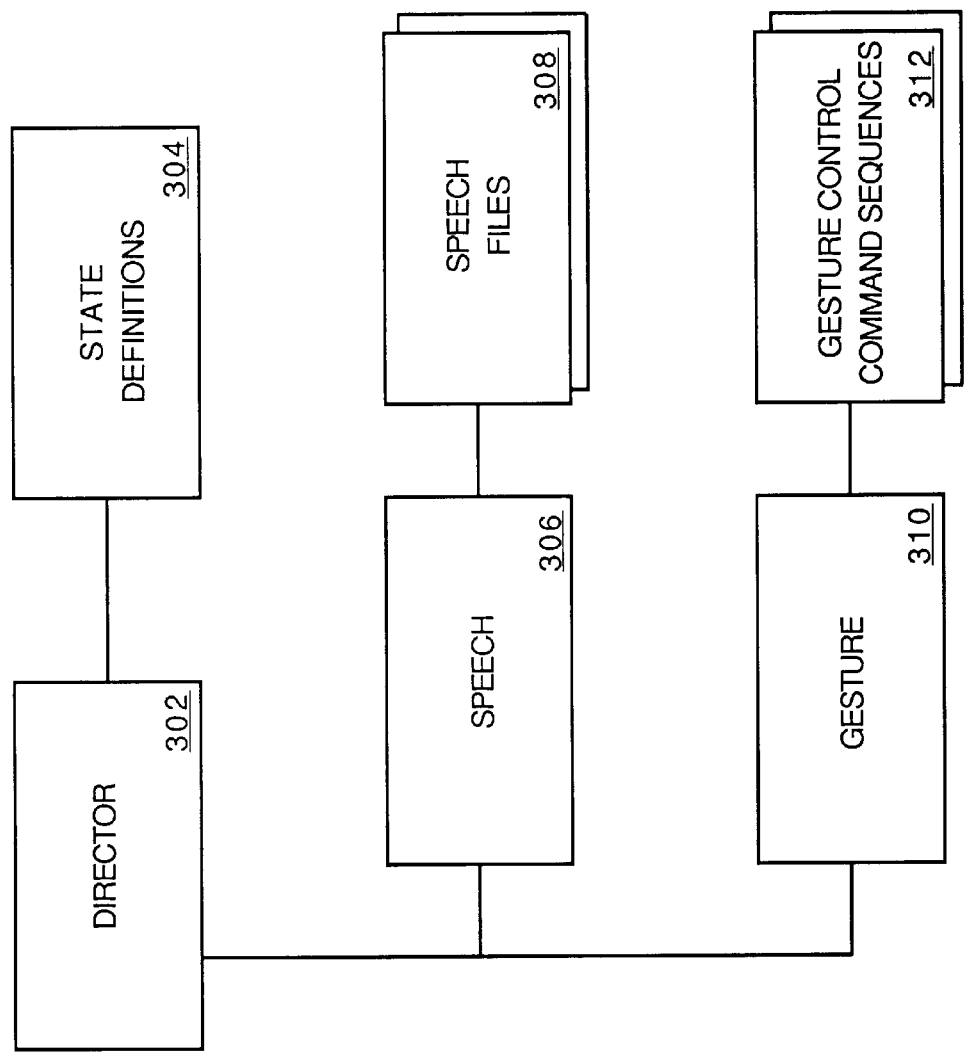

FIGS. 3a–3e illustrate one embodiment of interactive E/E character application 126. As shown in FIG. 3a, for the illustrated embodiment, character application 126 includes director module 302, state definitions 304, speech module 306, speech files 308, gesture module 308 and gesture sequences 312. State definitions 304 define the states for the character good and transitional rules between the states in terms of audio commands and scenes identified. Director module 302 operates to provide the overall control in accordance with state definitions 304.

Speech files 308 contain the actual speech or audio data to be rendered, and speech module 306, responsive to the control of director module 302, causes the appropriate speed files 308 to be rendered by the embedded audio output devices of the E/E character good, as described earlier. Similarly, gesture sequences 312 contain the actual commands to cause certain gestures to be manifested by the embedded electromechanical devices of the E/E character good, and gesture module 310, responsive to the control of director module 302, causes the appropriate command sequences to be sent to the electromechanical devices of the E/E character good, as described earlier.

FIG. 3b–3c illustrate a number of sample states and state transitional rules for the above mentioned "book reading" character good application. The sample states illustrated include Idle state 322, Greeting state 324, Show__Book state 326, Book1__Cover state 328, Book1__Page1 State 330, Don't__Understand State 332, and Can't__See State 334. Idle state 322 defines that Director 302 is to remain in the state until the event "greeting__recognized" occurs. At such time, Director 302 is to transition to Greeting state 324. As an example, the event "greeting__recognized" may be defined as an event whenever one of a number of predetermined audio sequence such as "Hello!", or "Hi, Reading Bear" is recognized. Greeting state 322 defines that Director 302 is to cause certain greeting audio and gestures to be rendered. Furthermore, Director 302 is to conditionally transition to a number of enumerated states, Show__Book, Don't__Understand etc. For examples, it is to transition to the Show__Book state if the "read__a__book recognized" event occurs or it is to transition to the "Don't__Understand" state if the "no__command__recognized" event occurs. As an example, the event "read__a__book__recognized" may be defined as an event whenever one of a number of predetermined audio sequence such as "I like to read a book", or "Let's read" is recognized. Similarly, as an example, the event "no_command_recognized" may be defined as an event whenever no predetermined audio sequence is recognized for n seconds while in the Greeting state.

Show_Book state 326 defines that Director 302 is to cause certain show_me_the_book audio and gestures to be rendered, and enables video input. Furthermore, Director 302 is to conditionally transition to a number of enumerated states, Book1_Cover, Bookn_Cover, Can't_See etc. For examples, it is to transition to the Book_1 state if the "book1_recognized" event occurs or it is to transition to the "Can't_See" state if the "no_book_recognized" event occurs. As an example, the event "book1_recognized" may be defined as an event whenever color regions based characteristics of book1 are recognized. Similarly, as an example, the event "no_book_recognized" may be defined as an event whenever no color region based characteristics of any book are recognized for n seconds while in the Show_Book state.

Book1_Cover state 328 defines that Director 302 is to cause certain read_bookname audio and gestures to be rendered. Furthermore, Director 302 is to conditionally transition to a number of enumerated states, Book1 Page1, Book1_Page2, Can't_See etc. For examples, it is to transition to the Book1_Page1 state if the "page1_recognized" event occurs or it is to transition to the "Can't_See" state if the "no_page_recognized" event occurs. As an example, the event "page1_recognized" may be defined as an event whenever color regions based characteristics of page1 of book1 are recognized. Similarly, as an example, the event "no_page_recognized" may be defined as an event whenever no color region based characteristics of any page of book1 are recognized for n seconds while in the Book1_Cover state.

The other page states, as represented by Book1_Pagei, are similarly defined. Don't_Understand state 332 defines that Director 302 is to cause certain don't_understand audio and gestures to be rendered. Furthermore, Director 302 is to unconditionally transition back to the Idle state. Can't_See state 334 defines that Director 302 is to cause certain can't_see audio and gestures to be rendered. Furthermore, Director 302 is to unconditionally return to the state it was in prior to entering the Can't_See state.

FIG. 3d illustrates a number of sample speech files. The sample speech files illustrated include speech files for various utterances 342, such as "Hello, what would you like to do today?", "Okay, show me the book you like to read!", "Good, let's read <bookname>", "Please turn a page". "What would you like to do next?", "Sorry, I don't understand", "Sorry, I can't see", and so forth, and audio contents of each page of each book supported, including the cover, 344. FIG. 3e illustrates a number of sample gesture sequences. The sample gesture sequences illustrated include Greeting gesture sequence 352 and Show_me_the_book gesture sequence 354, wherein the hand, the palm, and other limb positions/patterns at different points in time are defined. In one embodiment, the time are specified in incremental elapsed time.

Referring back to FIG. 3a, speech files 308 may be implemented in any one of a number of known audio data format, e.g. a wave file. Gesture sequences 312 may be coded in any one of a number of known machine control command languages. State definitions 304 may be implemented in any one of a number of known data organization structures. Lastly, director 302, speech module 306, and gesture module 310 may be coded in any one of a number of known programming languages, e.g. C++. Those skilled in the art will appreciate that the above described "book reading" application is merely illustrative. Numerous other interactive applications involving numerous states, audio and gesture sequences may be implemented in this manner.

Figure 4:
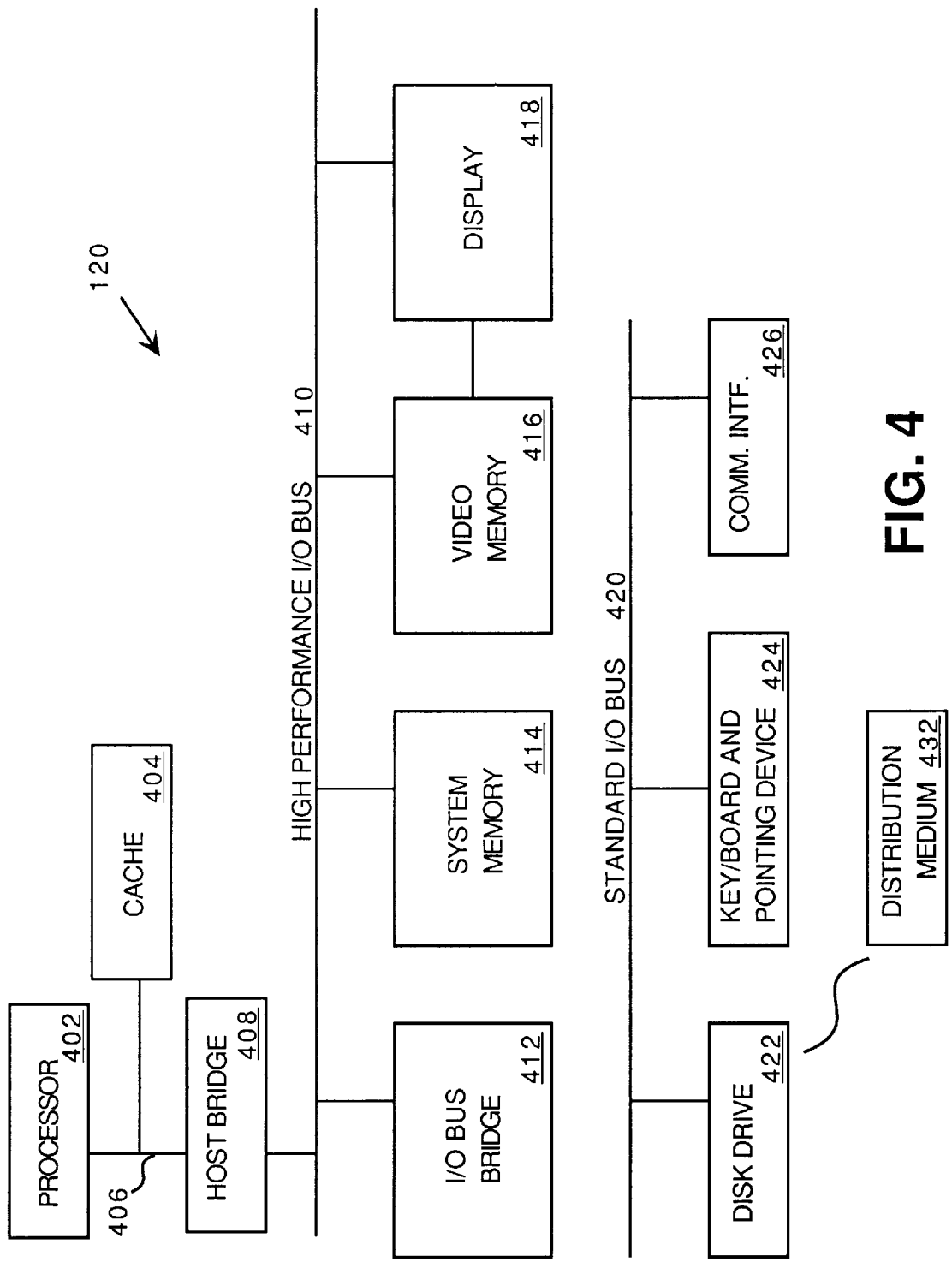
FIG. 4 is a block diagram illustrating a hardware view of one embodiment of a computer suitable for use to practice the present invention.

FIG. 4 illustrates a hardware view of one embodiment of computer 120. As shown, for the illustrated embodiment, computer 120 includes processor 402, processor bus 406, high performance I/O bus 410 and standard I/O bus 420. Processor bus 406 and high performance I/O bus 410 are bridged by host bridge 408, whereas I/O buses 410 and 412 are bridged by I/O bus bridge 412. Coupled to processor bus 406 is cache 404. Coupled to high performance I/O bus 410 are system memory 414 and video memory 416, against which video display 418 is coupled. Coupled to standard I/O bus 420 are disk drive 422, keyboard and pointing device 424, and communication interface 426. Depending on the embodiment, communication interface 416 may be a wireless interface, a serial interface, and so forth.

These elements perform their conventional functions known in the art. In particular, disk drive 422 and system memory 414 are used to store permanent and working copies of speech recognition service 122, scene recognition service 124 and interactive E/E character application 126. The permanent copies may be pre-loaded into disk drive 422 in factory, loaded from distribution medium 432, or down loaded from a remote distribution source (not shown). The constitutions of these elements are known. Any one of a number of implementations of these elements known in the art may be used to form computer system 120.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a computer assisted interactive entertainment/educational character good has been described.

What is claimed is:

1. A character good comprising:
   one or more video input generation devices that operate to generate video input signals responsive to scenery observed in the character good's surrounding, providing the character good with simulated visual ability; and
   one or more electromechanical output devices that operate to manifest gesture responses under the control of an external computer, providing the character good with simulated gesturing ability, the external computer exercising the control responsive to said generated video input signals which are forwarded to the external computer, which is communicatively coupled to the video input generation devices as well as the electromechanical output devices.

2. The character good of claim 1, further comprising:
   an audio generation device operating to generate audio input signals responsive to audio sensed in the character good's surrounding, providing the character good with simulated listening ability; and
   an audio electromechanical output device operating to manifest audio under the control of the external computer, providing the character good with simulated speech ability;
   wherein the audio and video input generation devices as well as the audio and electromechanical output devices are connected to the external computer allowing said generated audio and video input signals to be forwarded to the external computer, and the external computer to exercise control over the audio and electromechanical output devices.

3. The character good of claim 1, wherein the character good further includes a communication interface connected to the video input generation devices as well as the electromechanical output devices, and communicatively coupled the external computer, that operates to facilitate said forwarding of the generated video input signals to the external computer, and said exercise of control over the electromechanical output devices by the external computer.

4. The character good of claim 3, wherein the communication interface is serial interface.

5. The character good of claim 3, wherein the communication interface is wireless interface.

6. The character good of claim 1, wherein the character good further includes:

a micro-controller that facilitates said control of said electromechanical devices by said external computer, the micro-controller being connected to the electromechanical devices and communicatively coupled to the external computer.

7. The character good of claim 6, wherein the micro-controller also facilitates said forwarding of said generated video input signals to said external computer, the micro-controller being also connected to the video input generation devices.

8. The character good of claim 7, wherein the character good further includes:

a communication interface connected to the micro-controller and communicatively coupled to the external computer that operates to facilitate said forwarding of the generated video input signals to the external computer, and said exercise of control over the electromechanical output devices by the external computer.

9. The character good of claim 1, wherein the one or more video input generation devices include a video input generation device that operates to generate video input signals responsive to scenery observed in the character good's surrounding, for the external computer.

10. The character good of claim 1, further comprising:

an audio input generation device that operates to generate audio input signals, responsive to audio sensed in the character good's surrounding, for the external computer;

wherein said external computer is communicatively coupled to said generated audio input signals.

11. The character good of claim 10, further comprising:

an electromechanical audio output device that operates to manifest audio responses under the control of the external computer, said external computer communicatively coupled to said electromechanical audio output device.

12. The character good of claim 1, wherein the electromechanical output devices include at least one electromechanical output device that operates to manifest gesture responses under the control of the external computer.

13. The character good of claim 1, wherein the character good further includes:

a body having an exterior cover that operates to provide a facade for the character good, and to house the video input generation devices as well as the electromechanical output devices.

14. A character good comprising:

(a) a video input generation device that operates to generate video input signals responsive to scenery observed in the character good's surrounding, providing the character good with simulated visual ability; and (b) an audio output device that operates to manifest audio responses under the control of an external computer, providing the character good with simulated speech ability, the external computer exercising the control responsive to the generated video input signals which are forwarded to the external computer, which is communicatively coupled to the video input generation and audio output devices.

15. A character good comprising:

(a) a video input generation device that operates to generate video input signals responsive to scenery observed in the character good's surrounding, providing the character good with simulated visual ability;

(b) at least one electromechanical device that operates to manifest gesture responses under the control of an external computer, providing the character good with simulated gesture ability, the external computer exercising the control responsive to the generated video input signals which are forwarded to the external computer, which is communicatively coupled to the video input generation and electromechanical output devices; and (c) a body having an exterior cover that operates to provide a fagade for the character good, and to house the video input generation device as well as the electromechanical device(s).

16. A method comprising:

generating video input signals responsive to scenery observed in a character good's surrounding through video input generation devices embedded in the character good;

forwarding the generated video input signals to a computer external to the character good;

processing the forwarded video input signals by the external computer, and generating control signals for electromechanical output device(s) embedded in the character good by the external computer; and manifesting gesture responses by the embedded electromechanical output device(s) in accordance with said control signals.

17. The method as set forth in claim 16, wherein forwarding generated video input signals comprises pre-processing the generated video input signals before forwarding the generated video input signals to the external computer.

18. The method as set forth in claim 16, wherein processing forwarded video input signals comprises characterizing a scene observed in terms of color regions, identifying the scene observed in accordance with at least said color region characterizations, and generating said control signals in accordance with at least the scene identified.

19. The method as set forth in claim 16, wherein processing forwarded video input signals comprises analyzing audio input signals received and, identifying audio commands.

20. The method as set forth in claim 16, wherein the method is repeated periodically to provide different responses for different scenes.

21. An apparatus comprising:

a storage medium having stored therein a plurality of executable instructions, wherein when executed by a processor, the instructions process video input signals generated by video input generation devices embedded in a character good responsive to scenes observed in the character good's surrounding and forwarded to the apparatus, and generate control signals responsive to the video input signals to cause electromechanical output device(s) embedded in the character good to manifest gesture responses.

22. The apparatus as set forth in claim 21, wherein the instructions further include instructions to process audio input signals generated by an audio input generation device embedded in the character good, and when executed, process the audio input signals to identify audio commands.

23. The apparatus as set forth in claim 21, wherein the instructions, when executed, process the video input signals to identify a scene observed.

24. A storage medium having stored therein a plurality of machine executable instructions, wherein when executed, the instructions process video input signals generated by video input generation devices embedded in a character good responsive to scenes observed in the character good's surrounding and forwarded to the instructions, and generate control signals responsive to the video input signals to cause electromechanical output device(s) embedded in the character good to manifest gesture responses.

25. The storage medium as set forth in claim 24, wherein the instructions further include instructions to process audio input signals generated by an audio input generation device embedded in the character good, and when executed, process the audio input signals to identify audio commands.

26. The storage medium as set forth in claim 24, wherein the instructions, when executed, process the video input signals to identify a scene observed.

* * * * *

UNITED STATES PATENT AND TRADEMARK OFFICE
CERTIFICATE OF CORRECTION

PATENT NO. : 6,064,854
DATED : May 16, 2000
INVENTOR(S) : Peters et al.

It is certified that error appears in the above-identified patent and that said Letters Patent is hereby corrected as shown below:

Column 2,
Line 47, delete "fagade", insert -- facade --.

Signed and Sealed this

Fourth Day of June, 2002

Attest:

Attesting Officer

JAMES E. ROGAN
*Director of the United States Patent and Trademark Office*